(12) United States Patent
Kupiszewski et al.

(10) Patent No.: US 10,487,839 B2
(45) Date of Patent: Nov. 26, 2019

(54) EMBEDDED ELECTRIC MACHINE

(71) Applicant: General Electric Company, Schenectady, NY (US)

(72) Inventors: Thomas Kupiszewski, Liberty Township, OH (US); Brandon Wayne Miller, Liberty Township, OH (US); Daniel Alan Niergarth, Cincinnati, OH (US); Randy M. Vondrell, Cincinnati, OH (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 543 days.

(21) Appl. No.: 15/242,827

(22) Filed: Aug. 22, 2016

(65) Prior Publication Data

US 2018/0051701 A1 Feb. 22, 2018

(51) Int. Cl.
*F04D 25/06* (2006.01)
*F02C 3/04* (2006.01)
(Continued)

(52) U.S. Cl.
CPC ............ *F04D 25/06* (2013.01); *B64D 27/02* (2013.01); *B64D 27/24* (2013.01); *F01D 5/02* (2013.01);
(Continued)

(58) Field of Classification Search
CPC .. B64D 2027/026; B64D 27/10; B64D 27/18; B64D 27/24; F01D 25/24; F01D 5/02; F01D 5/10; F02C 3/04; F02C 6/00; F02C 7/32; F02C 7/36; F04D 19/002; F04D 25/06; F05D 2220/32; F05D 2220/76;
(Continued)

(56) References Cited

U.S. PATENT DOCUMENTS 2,812,912 A  11/1957 Stevens et al.
3,286,470 A  11/1966 Gerlaugh
(Continued)

FOREIGN PATENT DOCUMENTS

CA  2 831 625 A1  4/2015
EP  2 597 269 A2  5/2013
(Continued)

OTHER PUBLICATIONS http://aviationweek.com/awin/boeing-researches-alternative-propulsion-and-fuel-options, Aviation Week & Space Technology, Jun. 4, 2012.
(Continued)

*Primary Examiner* — Jesse S Bogue
(74) *Attorney, Agent, or Firm* — Dority & Manning, P.A.

(57) ABSTRACT

A gas turbine engine includes a compressor section and a turbine section together defining a core air flowpath. The rotary component is rotatable with the compressor section and the turbine section. The gas turbine engine additionally includes an electric machine rotatable with the rotary component and positioned coaxially with the rotary component at least partially inward of the core air flowpath. The electric machine is flexibly mounted to a static frame member, or flexibly coupled to the rotary component, or both, such that the electric machine is mechanically isolated or insulated from various internal and external forces on the gas turbine engine.

18 Claims, 7 Drawing Sheets

(51) Int. Cl.

| | | |
|---|---|---|
| *F01D 5/02* | (2006.01) | |
| *F01D 5/10* | (2006.01) | |
| *F02C 7/36* | (2006.01) | |
| *F01D 25/24* | (2006.01) | |
| *F04D 19/00* | (2006.01) | |
| *B64D 27/24* | (2006.01) | |
| *F02C 6/00* | (2006.01) | |
| *F02C 7/32* | (2006.01) | |
| *H02K 7/18* | (2006.01) | |
| *H02K 5/15* | (2006.01) | |
| *H02K 5/173* | (2006.01) | |
| *H02K 7/08* | (2006.01) | |
| *H02K 7/116* | (2006.01) | |
| *B64D 27/02* | (2006.01) | |

(52) U.S. Cl.
 CPC ............... *F01D 5/10* (2013.01); *F01D 25/24* (2013.01); *F02C 3/04* (2013.01); *F02C 6/00* (2013.01); *F02C 7/32* (2013.01); *F02C 7/36* (2013.01); *F04D 19/002* (2013.01); *H02K 5/15* (2013.01); *H02K 5/1732* (2013.01); *H02K 7/083* (2013.01); *H02K 7/116* (2013.01); *H02K 7/1823* (2013.01); *B64D 2027/026* (2013.01); *F05D 2220/32* (2013.01); *F05D 2220/76* (2013.01); *F05D 2220/766* (2013.01); *F05D 2240/24* (2013.01); *F05D 2260/40311* (2013.01); *F05D 2260/96* (2013.01); *Y02T 50/672* (2013.01); *Y02T 50/673* (2013.01)

(58) Field of Classification Search
 CPC ........... F05D 2220/766; F05D 2240/24; F05D 2260/40311; F05D 2260/96; H02K 5/15; H02K 5/1732; H02K 7/083; H02K 7/116; H02K 7/1823; Y02T 50/672; Y02T 50/673
 See application file for complete search history.

(56) References Cited

U.S. PATENT DOCUMENTS

| | | | |
|---|---|---|---|
| 3,312,448 A | | 4/1967 | Hull, Jr. et al. |
| 3,844,110 A | | 10/1974 | Widlansky et al. |
| 4,089,493 A | | 5/1978 | Paulson |
| 4,370,560 A | | 1/1983 | Faulkner et al. |
| 4,605,185 A | | 8/1986 | Reyes |
| 4,913,380 A | | 4/1990 | Verdaman et al. |
| 5,174,109 A | | 12/1992 | Lampe |
| 5,799,484 A | | 9/1998 | Nims |
| 5,927,644 A | | 7/1999 | Ellis et al. |
| 6,105,697 A | | 8/2000 | Weaver |
| 6,169,332 B1 | | 1/2001 | Taylor et al. |
| 6,467,725 B1 * | | 10/2002 | Coles ...................... F01D 15/10 244/58 |
| 6,545,373 B1 | | 4/2003 | Andres et al. |
| 6,817,431 B1 * | | 11/2004 | Rasch ..................... H02K 1/185 180/65.22 |
| 6,834,831 B2 | | 12/2004 | Daggett |
| 6,976,655 B2 | | 12/2005 | Thompson |
| 6,992,403 B1 | | 1/2006 | Raad |
| 7,251,942 B2 | | 8/2007 | Dittmar et al. |
| 7,267,300 B2 | | 9/2007 | Heath et al. |
| 7,285,871 B2 | | 10/2007 | Derouineau |
| 7,380,749 B2 | | 6/2008 | Fucke et al. |
| 7,387,189 B2 | | 6/2008 | James et al. |
| 7,417,337 B1 | | 8/2008 | Suttie |
| 7,493,754 B2 | | 2/2009 | Moniz et al. |
| 7,495,354 B2 | | 2/2009 | Herrmann |
| 7,514,810 B2 * | | 4/2009 | Kern ....................... F01D 15/10 290/52 |
| 7,528,499 B2 | | 5/2009 | Suttie |
| 7,550,881 B1 * | | 6/2009 | Dietrich ................ H02K 1/187 310/154.12 |
| 7,665,689 B2 | | 2/2010 | McComb |
| 7,677,502 B2 | | 3/2010 | Lawson et al. |
| 7,752,834 B2 | | 7/2010 | Addis |
| 7,806,363 B2 | | 10/2010 | Udall et al. |
| 7,818,969 B1 | | 10/2010 | Hotto |
| 7,819,358 B2 | | 10/2010 | Belleville |
| 7,905,449 B2 | | 3/2011 | Cazals et al. |
| 7,952,244 B2 | | 5/2011 | Colin |
| 7,958,727 B2 | | 6/2011 | Arnold |
| 7,970,497 B2 | | 6/2011 | Derouineau et al. |
| 7,976,273 B2 | | 7/2011 | Suciu et al. |
| 8,016,228 B2 | | 9/2011 | Fucke et al. |
| 8,033,094 B2 | | 10/2011 | Suciu et al. |
| 8,039,983 B2 | | 10/2011 | Cote et al. |
| 8,099,944 B2 | | 1/2012 | Foster et al. |
| 8,109,073 B2 | | 2/2012 | Foster et al. |
| 8,128,019 B2 | | 3/2012 | Annati et al. |
| 8,141,360 B1 | | 3/2012 | Huber |
| 8,162,254 B2 | | 4/2012 | Roche |
| 8,193,761 B1 | | 6/2012 | Singh |
| 8,220,739 B2 | | 7/2012 | Cazals |
| 8,226,040 B2 | | 7/2012 | Neto |
| 8,291,716 B2 | | 10/2012 | Foster et al. |
| 8,317,126 B2 | | 11/2012 | Harris et al. |
| 8,413,750 B2 * | | 4/2013 | Lamke ................... B60K 6/485 180/65.6 |
| 8,432,048 B1 | | 4/2013 | Paulino |
| 8,469,306 B2 | | 6/2013 | Kuhn, Jr. |
| 8,476,798 B2 * | | 7/2013 | Dooley .................. F01D 15/10 310/112 |
| 8,489,246 B2 | | 7/2013 | Dooley |
| 8,492,920 B2 | | 7/2013 | Huang et al. |
| 8,522,522 B2 | | 9/2013 | Poisson |
| 8,549,833 B2 | | 10/2013 | Hyde et al. |
| 8,552,575 B2 | | 10/2013 | Teets et al. |
| 8,568,938 B2 | | 10/2013 | Gao et al. |
| 8,596,036 B2 | | 12/2013 | Hyde et al. |
| 8,631,657 B2 | | 1/2014 | Hagen et al. |
| 8,640,439 B2 | | 2/2014 | Hoffjann et al. |
| 8,657,227 B1 | | 2/2014 | Bayliss et al. |
| 8,672,263 B2 | | 3/2014 | Stolte |
| 8,684,304 B2 | | 4/2014 | Burns et al. |
| 8,692,489 B2 | | 4/2014 | Maalioune |
| 8,723,349 B2 | | 5/2014 | Huang et al. |
| 8,723,385 B2 | | 5/2014 | Jia et al. |
| 8,742,605 B1 | | 6/2014 | Wilhide et al. |
| 8,829,702 B1 * | | 9/2014 | Menheere ............... F02C 7/275 290/47 |
| 8,836,160 B1 | | 9/2014 | Paterson et al. |
| 8,857,191 B2 | | 10/2014 | Hyde et al. |
| 8,890,343 B2 | | 11/2014 | Bulin et al. |
| 8,925,660 B2 | | 1/2015 | Bowdich et al. |
| 8,928,166 B2 | | 1/2015 | Seger et al. |
| 8,939,399 B2 | | 1/2015 | Kouros et al. |
| 8,950,703 B2 | | 2/2015 | Bayliss et al. |
| 8,957,539 B1 | | 2/2015 | Ralston |
| 8,997,493 B2 | | 4/2015 | Brust et al. |
| 8,998,580 B2 | | 4/2015 | Quiroz-Hernandez |
| 9,003,638 B2 * | | 4/2015 | Menheere ............... H02K 15/02 29/596 |
| 9,004,849 B2 | | 4/2015 | Munsell et al. |
| 9,038,398 B2 | | 5/2015 | Suciu et al. |
| 9,045,996 B2 | | 6/2015 | Anghel et al. |
| 9,059,440 B2 | | 6/2015 | Hotto |
| 9,068,562 B1 | | 6/2015 | Budica et al. |
| 9,143,023 B1 | | 9/2015 | Uskert |
| 9,190,892 B2 | | 11/2015 | Anthony |
| 9,917,490 B2 * | | 3/2018 | Lemmers ............... H02K 7/116 |
| 2005/0042944 A1 * | | 2/2005 | Brach ..................... B63H 5/125 440/6 |
| 2006/0037325 A1 | | 2/2006 | Peters et al. |
| 2008/0056892 A1 | | 3/2008 | Barton et al. |
| 2009/0179424 A1 | | 7/2009 | Yaron |
| 2010/0038473 A1 | | 2/2010 | Schneider et al. |
| 2011/0016882 A1 | | 1/2011 | Woelke et al. |
| 2011/0073389 A1 * | | 3/2011 | Lamke ................... B60K 6/485 180/65.1 |

(56) References Cited

U.S. PATENT DOCUMENTS

| | | |
|---|---|---|
| 2012/0119020 A1 | 5/2012 | Burns et al. |
| 2012/0153076 A1 | 6/2012 | Burns et al. |
| 2012/0209456 A1 | 8/2012 | Harmon et al. |
| 2012/0214605 A1* | 8/2012 | Snook ............... F01D 15/10 464/68.41 |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0088019 A1 | 4/2013 | Huang et al. |
| 2013/0099065 A1 | 4/2013 | Stuhlberger |
| 2013/0133336 A1* | 5/2013 | Barnett ............... F01D 15/10 60/802 |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2014/0010652 A1 | 1/2014 | Suntharalingam et al. |
| 2014/0060995 A1 | 3/2014 | Anderson et al. |
| 2014/0084677 A1 | 3/2014 | Haillot |
| 2014/0151495 A1 | 6/2014 | Kuhn, Jr. |
| 2014/0245748 A1 | 9/2014 | Anghel et al. |
| 2014/0250861 A1 | 9/2014 | Eames |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0183522 A1 | 7/2015 | Ouellette |
| 2015/0380999 A1 | 12/2015 | Joshi et al. |
| 2016/0061053 A1 | 3/2016 | Thomassin |
| 2016/0160867 A1* | 6/2016 | Gehlot ............... F04D 27/02 60/805 |
| 2018/0050806 A1 | 2/2018 | Kupiszewski et al. |
| 2018/0050807 A1 | 2/2018 | Kupiszewski et al. |
| 2018/0051702 A1 | 2/2018 | Kupiszewski et al. |

FOREIGN PATENT DOCUMENTS

| | | |
|---|---|---|
| EP | 2 947 278 A1 | 11/2015 |
| EP | 3 048 042 A1 | 7/2016 |
| GB | 2489311 A | 9/2012 |
| WO | WO2010/020199 A1 | 2/2010 |
| WO | WO2014/072615 A1 | 5/2014 |
| WO | WO2014/123740 A1 | 8/2014 |

OTHER PUBLICATIONS

Bradley et al., "Subsonic Ultra Green Aircraft Research, Phase II: N+4 Advanced Concept Development," NASA/CR-2012-217556, May 2012.

Simon Schramm, Damping of Torsional Interaction Effects in Power Systems, 2010.

International Search Report and Written Opinion issued in connection with corresponding PCT Application No. PCT/US2017/047110 dated Jan. 29, 2018.

* cited by examiner

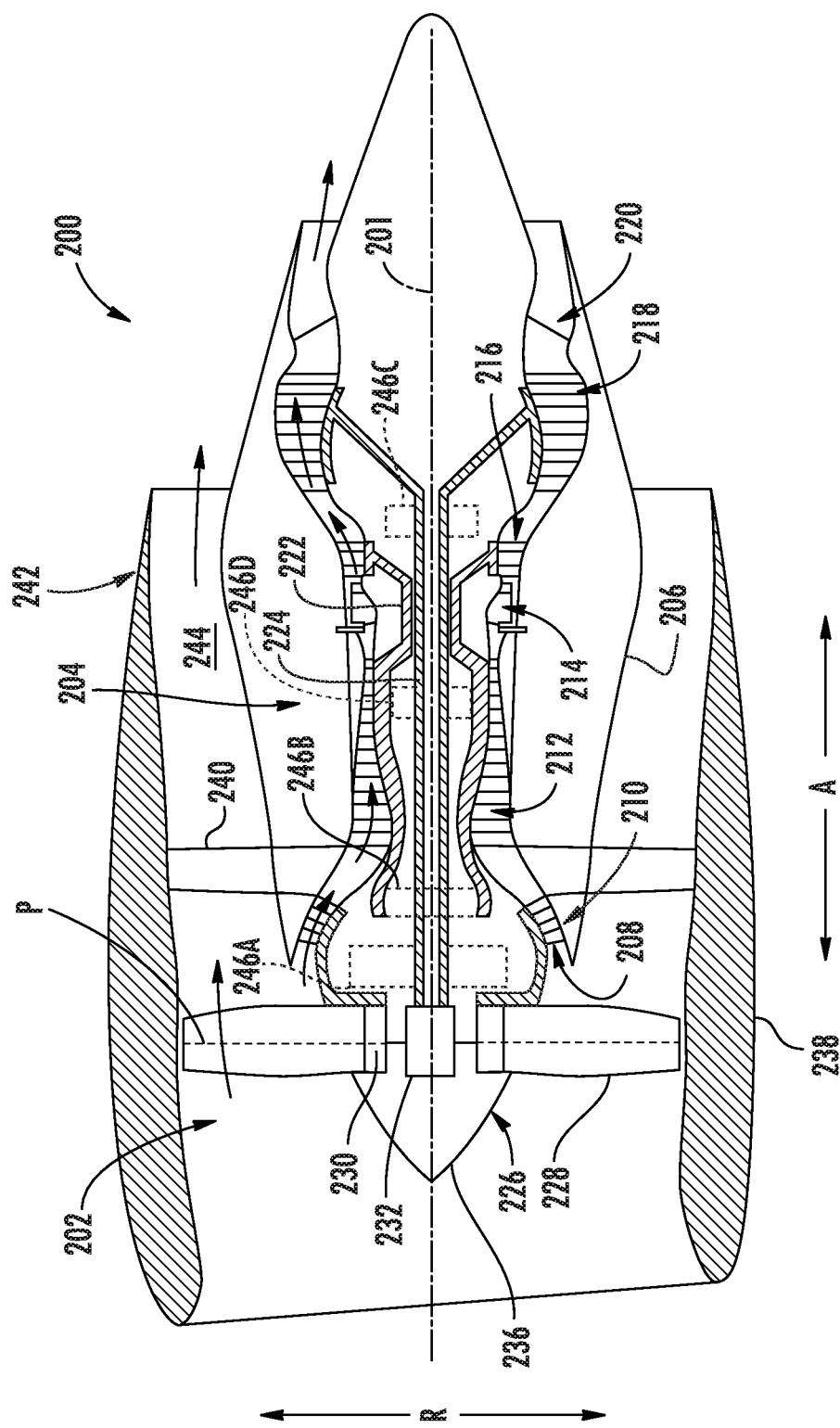

EMBEDDED ELECTRIC MACHINE

FIELD OF THE INVENTION

The present subject matter relates generally to a gas turbine engine having an embedded electric machine, and to a propulsion system for an aeronautical device including the same.

BACKGROUND OF THE INVENTION

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For certain aircraft, it may be beneficial for the propulsion system to include an electric fan to supplement propulsive power provided by the one or more gas turbine engines included with the propulsion system. However, providing the aircraft with a sufficient amount of energy storage devices to power the electric fan may be space and weight prohibitive. Notably, certain gas turbine engines may include auxiliary generators positioned, e.g., within a cowling of the gas turbine engine. However, these auxiliary generators are not configured to provide a sufficient amount of electrical power to adequately drive the electric fan.

Accordingly, a propulsion system for an aircraft having one or more gas turbine engines and electric generators capable of providing an electric fan, or other electric propulsor, with a desired amount of electrical power would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine defines a radial direction and an axial direction. The gas turbine engine includes a compressor section and a turbine section arranged in serial flow order, the compressor section and turbine section together defining a core air flowpath. The gas turbine engine also includes a rotary component rotatable with at least a portion of the compressor section and with at least a portion of the turbine section. The gas turbine engine also includes a static frame member and an electric machine rotatable with the rotary component. The electric machine is positioned at least partially inward of the core air flowpath along the radial direction, the electric machine flexibly mounted to the static frame member, or flexibly coupled to the rotary component, or both.

In another exemplary embodiment of the present disclosure, a propulsion system is provided for an aeronautical device. The propulsion system includes an electric propulsor and a gas turbine engine. The gas turbine engine defines a radial direction and an axial direction. The gas turbine engine includes a compressor section and a turbine section arranged in serial flow order, the compressor section and turbine section together defining a core air flowpath. The gas turbine engine also includes a rotary component rotatable with at least a portion of the compressor section and with at least a portion of the turbine section. The gas turbine engine also includes a static frame member and an electric machine rotatable with the rotary component. The electric machine is positioned at least partially inward of the core air flowpath along the radial direction. The electric machine is electrically connected to the electric propulsor. The electric machine is also flexibly mounted to the static frame member, or flexibly coupled to the rotary component, or both.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 is a schematic, cross-sectional view of a gas turbine engine in accordance with another exemplary embodiment of the present disclosure.

DETAILED DESCRIPTION OF THE INVENTION

Figure 1:
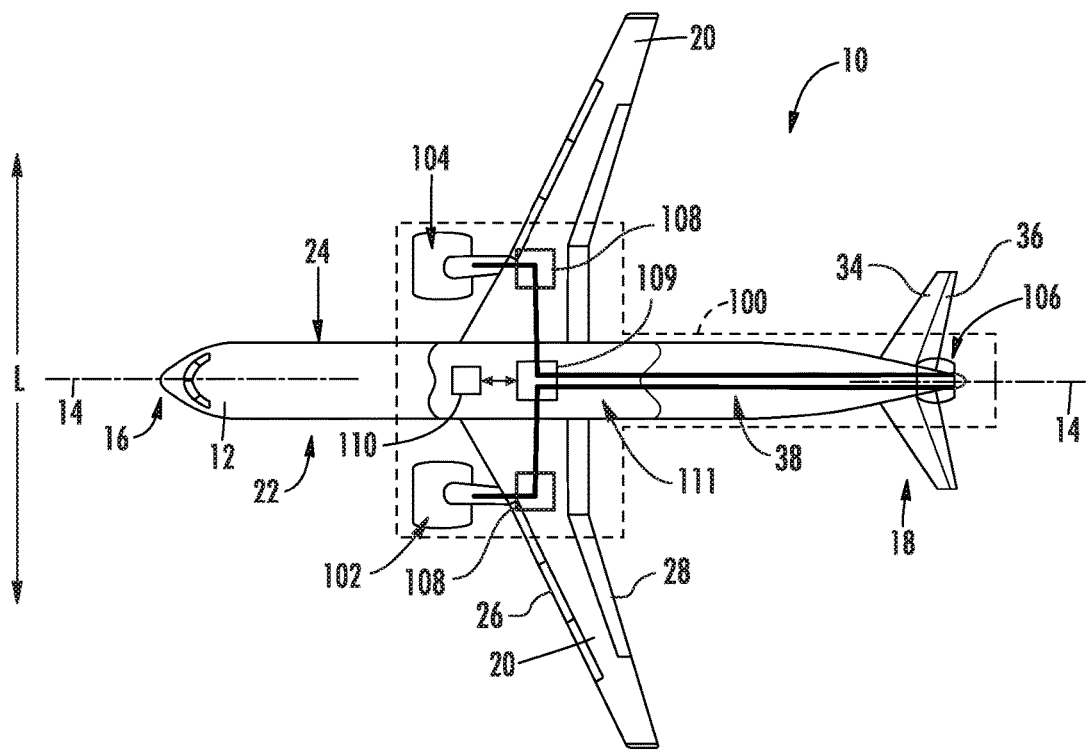
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The present application is directed generally towards a gas turbine engine of a propulsion system for an aircraft having an electric machine embedded therein. In at least certain embodiments, the gas turbine engine includes a compressor section and a turbine section arranged in serial flow order and together defining a core air flowpath. A rotary component, such as a shaft or spool, is rotatable with at least a portion of the compressor section and the turbine section. The gas turbine engine additionally includes a static frame member, such as one or more structural support members, and an electric machine. The electric machine is rotatable with the rotary component. The electric machine is positioned coaxially with the rotary component at least partially inward of the core air flowpath along a radial direction of the gas turbine engine. For example, in at least certain embodiments, the electric machine may be an electric generator, driven by the rotary component. Additionally, the electric machine is flexibly mounted to the static frame member, or flexibly coupled to the rotary component, or both. Such a configuration may increase a useful life of the electric machine by at least partially mechanically isolating the electric machine from certain internal and/or external static and dynamic forces of the gas turbine engine.

Figure 2:
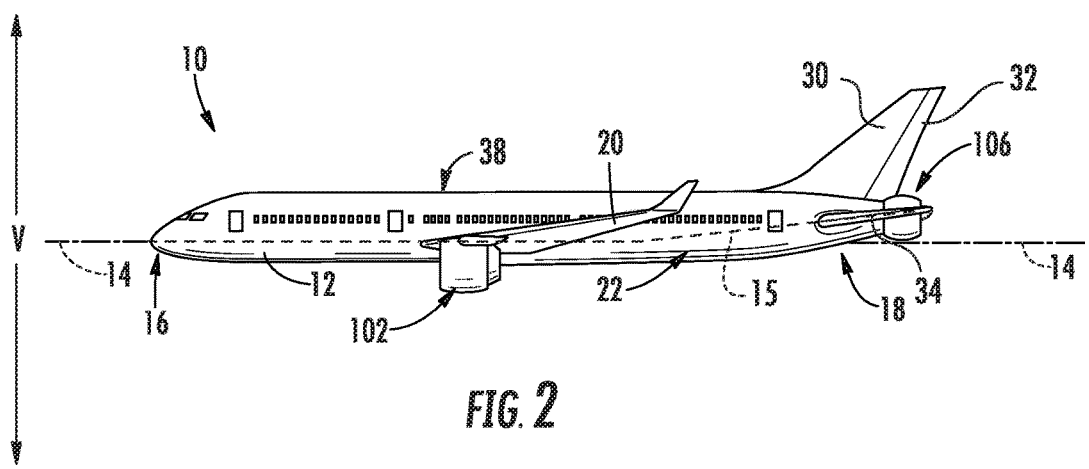
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18 of the aircraft 10. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine." Moreover, in other embodiments, the electric propulsion engine may not be a boundary layer ingestion fan, and instead may be mounted at any suitable location on the aircraft 10 as a freestream injection fan. Furthermore, in still other embodiments, the propulsion system 100 may not include, e.g., the power conditioner 109 and/or the energy storage device 110, and instead the generator(s) 108 may be directly connected to the BLI fan 106.

Figure 3:
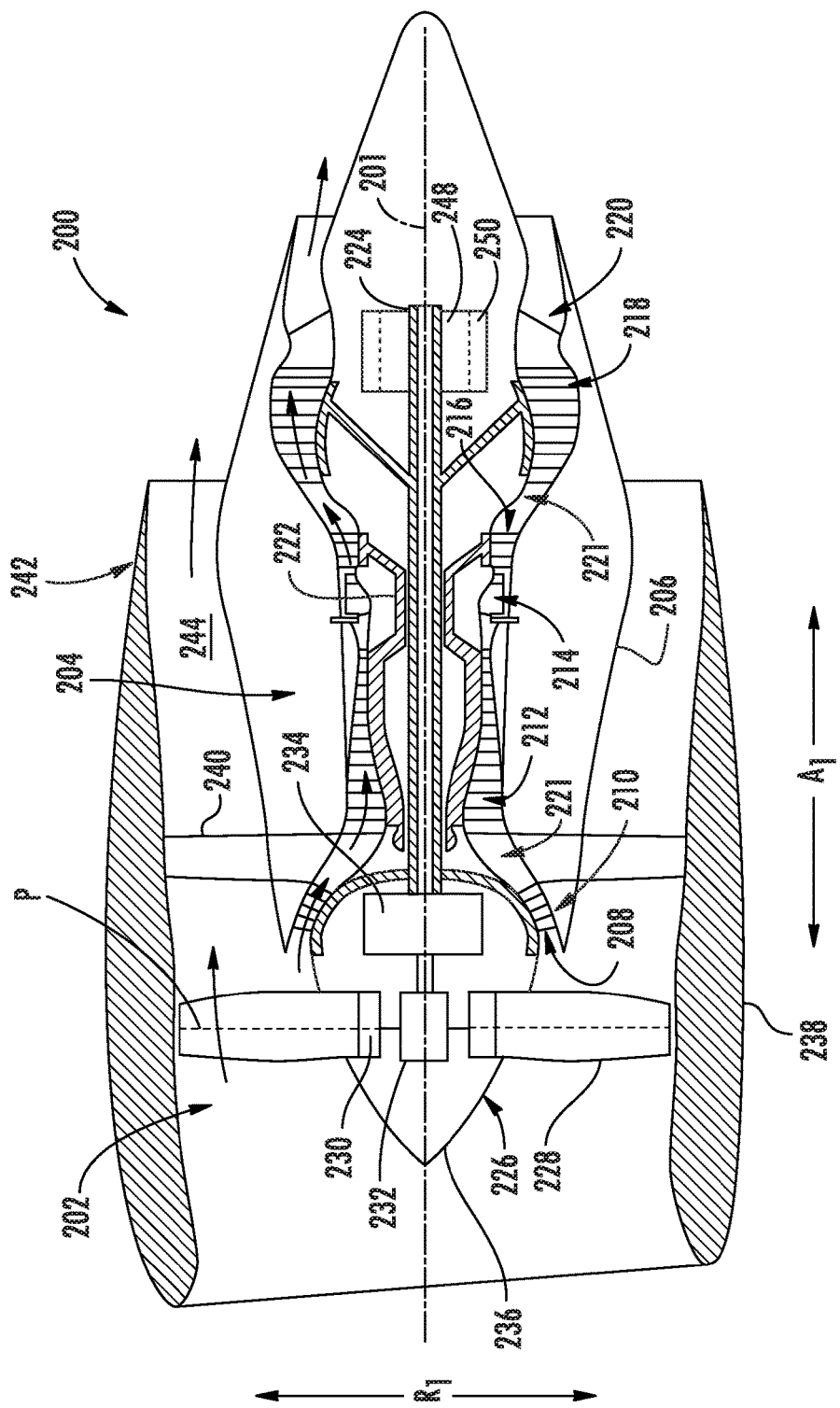
FIG. 3 is a schematic, cross-sectional view of a gas turbine engine in accordance with an exemplary aspect of the present disclosure.

Referring now to FIG. 3, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 102, 104 may be also configured as high-bypass turbofan jet engines. In various embodiments, the turbofan 200 may be representative of jet engines 102, 104. Alternatively, however, in other embodiments, the turbofan 200 may be incorporated into any other suitable aircraft 10 or propulsion system 100.

As shown in FIG. 3, the turbofan 200 defines an axial direction A (extending parallel to a longitudinal centerline 201 provided for reference), a radial direction R, and a circumferential direction C (extending about the axial direction A; not depicted in FIG. 3). In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a core air flowpath 221 extending from the annular inlet 208 through the LP compressor 210, HP compressor 212, combustion section 214, HP turbine section 216, LP turbine section 218 and jet nozzle exhaust section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. The nacelle 238 is supported relative to the core turbine engine 204 by a plurality of circumferentially-spaced outlet guide vanes 240. A downstream section 242 of the nacelle 238 extends over an outer portion of the core turbine engine 204 so as to define a bypass airflow passage 244 therebetween.

Additionally, the exemplary turbofan 200 depicted includes an electric machine 246 rotatable with the fan 226. Specifically, for the embodiment depicted, the electric machine 246 is configured as an electric generator co-axially mounted to and rotatable with the LP shaft 224 (the LP shaft 224 also rotating the fan 226 through, for the embodiment depicted, the power gearbox 234). The electric machine 246 includes a rotor 248 and a stator 250. In certain exemplary embodiments, the rotor 248 and stator 250 of the electric machine 246 are configured in substantially the same manner as the exemplary rotor and stator of the electric machine described below. Notably, when the turbofan engine 200 is integrated into the propulsion system 100 described above with reference to FIGS. 1 and 2, the electric generators 108 may be configured in substantially the same manner as the electric machine 246 of FIG. 3.

It should be also appreciated, however, that the exemplary turbofan engine 200 depicted in FIG. 3 is provided by way of example only, and that in other exemplary embodiments, the turbofan engine 200 may have any other suitable configuration. For example, in other exemplary embodiments, the turbofan engine 200 may be configured as a turboprop engine, a turbojet engine, a differently configured turbofan engine, or any other suitable gas turbine engine.

Figure 4:
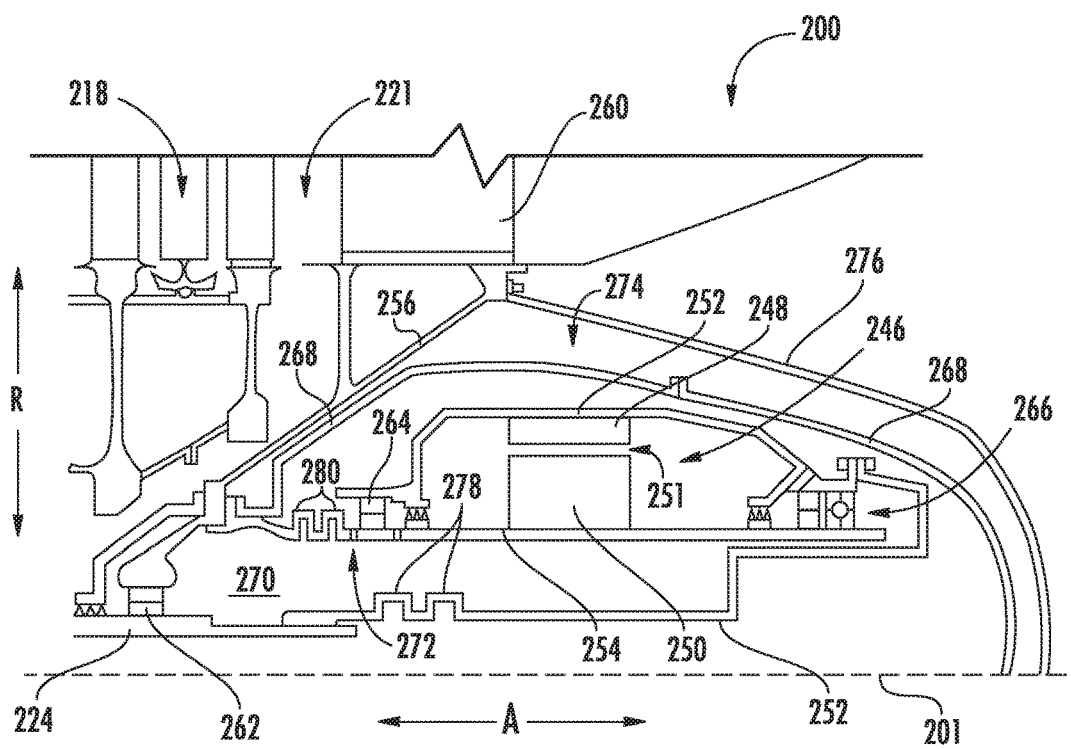
FIG. 4 is a schematic, cross-sectional view of an electric machine embedded in a gas turbine engine in accordance with an exemplary embodiment of the present disclosure.

Referring now to FIG. 4, an electric machine 246 embedded within a gas turbine engine in accordance with an exemplary embodiment of the present disclosure is depicted. More particularly, for the embodiment depicted, the electric machine 246 is embedded within a turbine section of the gas turbine engine, and more particularly still, is attached to an LP shaft 224 of the gas turbine engine. Additionally, the electric machine 246 is positioned at least partially within or aft of the turbine section along an axial direction A. In certain exemplary embodiments, the electric machine 246 and gas turbine engine depicted in FIG. 4 may be configured in substantially the same manner as the exemplary electric machine 246 and turbofan engine 200 described above with reference to FIG. 3. Accordingly, the same or similar numbers may refer to the same or similar parts.

For the embodiment depicted, the electric machine 246 generally includes a rotor 248 and a stator 250. The rotor 248 is attached via a plurality of rotor connection members 252 directly to the LP shaft 224, such that the rotor 248 is rotatable with the LP shaft 224. By contrast, the stator 250 is attached via one or more stator connection members 254 to a static frame member of the gas turbine engine, or more particularly, to a structural support member 256 of the gas turbine engine. As will be discussed in greater detail below, the connection of the rotor 248 and stator 250 of the electric machine 246 to the respective LP shaft 224 and structural support member 256 may mechanically isolate the electric machine 246. Notably, in at least certain exemplary embodiments, the electric machine 246 may be an electric generator, such that the rotor 248, and rotor connection members 252, are driven by the LP shaft 224. With such an embodiment, a rotation of the rotor 248 relative to the stator 250 may generate electrical power, which may be transferred via an electric communication bus to one or more systems of the gas turbine engine, or to a propulsion system with which the gas turbine engine is included.

Referring still to the exemplary electric motor of FIG. 4, the structural support member 256 extends from an aft strut 260 of the gas turbine engine. The aft strut 260 may be configured as part of an aft frame assembly for the gas turbine engine. The aft strut 260 extends through the core air flowpath 221 of the gas turbine engine, and is configured to provide structural support for the gas turbine engine. The structural support member 256 also extends forward to support an aft bearing 262—the aft bearing 262 rotatably supporting an aft end of the LP shaft 224.

The stator connection member 254 may be an annular/cylindrical member extending from the structural support member 256 of the gas turbine engine. For the embodiment depicted, the stator connection member 254 supports rotation of the rotor 248 and rotor connection members 252 through one or more bearings. More specifically, a forward electric machine bearing 264 is positioned forward of the electric machine 246 and between the rotor connection member 252 and the stator connection member 254 along the radial direction R. Similarly, an aft electric machine bearing 266 is positioned aft of the electric machine 246 and between the rotor connection member 252 and the stator connection member 254 along the radial direction R. Particularly for the embodiment depicted, the forward electric machine bearing 264 is configured as a roller element bearing and the aft electric machine bearing 266 includes a pair of bearings, the pair of bearings configured as a roller element bearing and a ball bearing. It should be appreciated, however, that the forward and aft electric machine bearings 264, 266 may in other embodiments, have any other suitable configuration and the present disclosure is not intended to be limited to the specific configuration depicted, unless such limitations are added to the claims.

The gas turbine engine further includes a cavity wall 268 surrounding at least a portion of the electric machine 246. More specifically, for the embodiment depicted, the cavity wall 268 substantially completely surrounds the electric machine 246, extending from a location forward of the electric machine 246 (attached to the structural support member 256 through the stator connection member 254) to a location aft of the electric machine 246. The cavity wall 268 defines at least in part an electric machine sump 270 substantially completely surrounding the electric machine 246. More specifically, the electric machine sump 270 extends from a location forward of the electric machine 246 continuously to a location aft of the electric machine 246. Certain components include openings 272 to allow for such a continuous extension of the electric machine sump 270. Notably, for the embodiment depicted, the electric machine sump 270 additionally encloses the aft bearing 262 of the gas turbine engine. Although not depicted, the gas turbine engine may include an electric machine lubrication system for providing lubrication to, and scavenging lubrication from the electric machine sump 270. The electric machine lubrication system may remove an amount of heat from the electric machine sump 270 and electric machine 246.

In order to further reduce/maintain a temperature of the electric machine 246, the exemplary gas turbine engine depicted further includes a buffer cavity 274 surrounding at least a portion of the electric machine 246 to thermally insulate the electric machine 246. More specifically, for the embodiment depicted, the cavity wall 268 at least partially defines the buffer cavity 274. Additionally, as is seen depicted in FIG. 4, an extension member 276 is attached to or formed integrally with the structural support member 256 and extends at least partially around the cavity wall 268. Specifically, for the embodiment depicted, the structural support member 256 and extension member 276 together extend completely around the cavity wall 268. The structural support member 256 and extension member 276 together define the buffer cavity 274, which for the embodiment depicted extends continuously from a location forward of the electric machine 246 to a location aft of the electric machine 246. The buffer cavity 274 may act as an insulator from relatively hot operating temperatures within the core air flowpath 221 extending through the turbine section of the gas turbine engine.

Referring still to FIG. 4, as briefly mentioned above, the electric machine 246 is mounted, for the embodiment depicted, through one or more stator connection members 254 and one or more rotor connection members 252. The rotor connection member 252 is attached directly to a rotary component of the gas turbine engine, or more particularly, to an aft end of the LP shaft 224 for the exemplary gas turbine engine depicted. The stator connection member 254 is attached directly to a static frame member, or more particularly, to the structural support member 256 extending from the aft engine strut 260 of the gas turbine engine. Notably, the electric machine 246 is flexibly mounted to the structural support member 256, flexibly coupled to the LP shaft 224, or both. Or more particularly, for the embodiment depicted the stator connection member 254 and rotor connection member 252 are configured to flexibly mount and flexibly couple the stator 250 and rotor 248, respectively, to the structural support member 256 and LP shaft 224, respectively.

Specifically, for the embodiment depicted, the rotor connection member 252 includes one or more flexible members allowing the rotor connection member 252 to flex or bend in response to various static or dynamic forces during operation of the gas turbine engine. Similarly, for the embodiment depicted, the stator connection member 254 includes one or more flexible members allowing the stator connection member 254 to flex or bend in response to various static or dynamic forces during operation of the gas turbine engine. For the embodiment depicted, the flexible members of the rotor connection member 252 are configured as a pair of baffles 278 positioned proximate to the LP shaft 224, at a location forward of the rotor 248 along the axial direction A of the gas turbine engine. Additionally for the embodiment depicted, the flexible members of the stator connection member 254 are also configured as a pair of baffles 280 positioned proximate to the structural support member 256 at a location forward of the stator 250 along the axial direction A of the gas turbine engine. Inclusion of the flexible members with the rotor connection member 252 and the stator connection member 254 may allow for the electric machine 246 to be mechanically isolated or insulated from various forces acting on or within the gas turbine engine during operation, e.g., for increasing a useful life of the electric machine 246. As depicted, the term "baffles" refers to a section of, e.g., a cylindrical member including a plurality of bends in relatively close proximity to provide an amount of flexibility to the cylindrical member.

It should be appreciated, however, that in other embodiments, the rotor connection member 252 and stator connection member 254 may be configured in any other suitable manner for flexibly mounting and/or flexibly coupling the electric machine 246 within the gas turbine engine and to a rotary component. For example, in certain embodiments, the rotor connection member 252 and stator connection member 254 may include any other suitable flexible members configured to allow the electric machine 246 to absorb static and/or dynamic forces. For example, referring now to FIG. 5, a close-up, schematic view of a gas turbine engine including an electric machine 246 in accordance with another exemplary embodiment of the present disclosure is provided. The exemplary gas turbine engine and electric machine 246 depicted in FIG. 5 may be configured in substantially the same manner as exemplary gas turbine engine and electric machine 246 depicted in FIG. 4 and described above.

The exemplary gas turbine engine includes a rotary connection member 252 flexibly coupling a rotor 248 of an electric machine 246 to a rotary component (e.g., an LP shaft 224). The rotor connection member 252 includes a flexible element. However, for the embodiment depicted, the flexible element of the rotor connection member 252 is not configured as a pair of baffles 278. Instead, for the embodiment of FIG. 5, the flexible element of the rotor connection member 252 is configured as a flexible attachment assembly 282. More particularly, the flexible attachment assembly 282 of the rotor connection member 252 includes a splined coupling portion 284 configured to interact with a splined coupling portion 286 of the LP shaft 224. Specifically, for the embodiment depicted, the splined coupling portion 284 of the rotor connection member 252 is received over the splined coupling portion 286 of the LP shaft 224, and the rotor connection member 252 includes a damper 288 therebetween.

Figure 5:
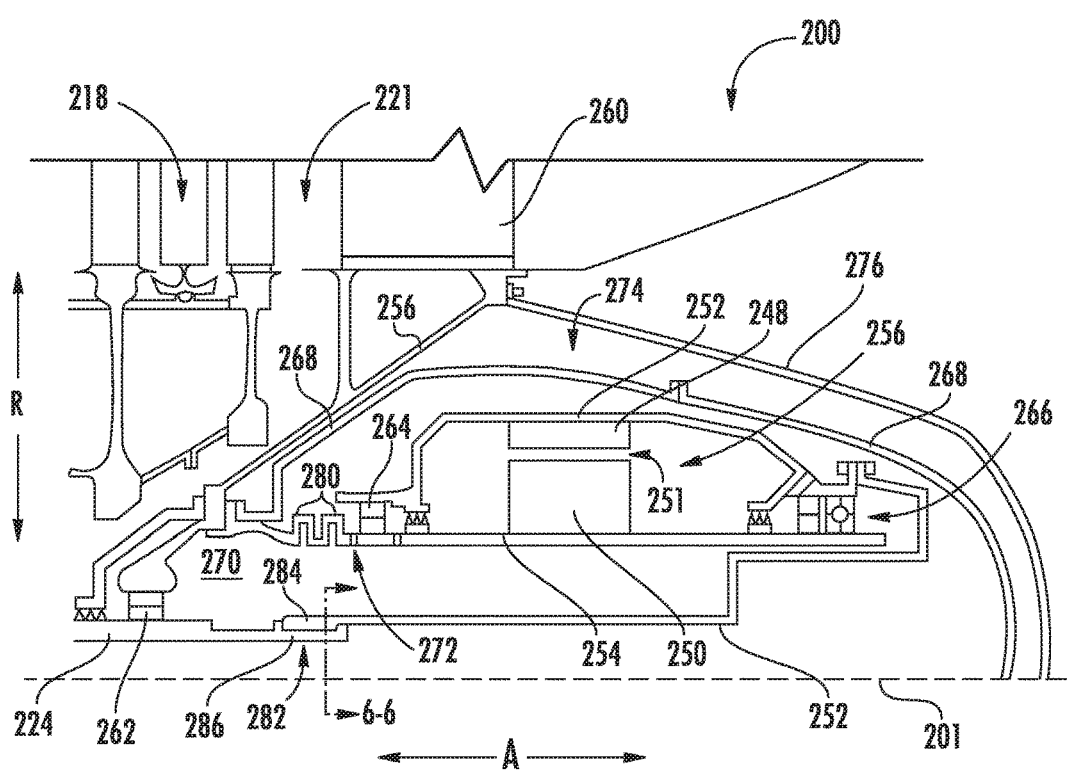
FIG. 5 is a schematic, cross-sectional view of an electric machine embedded in a gas turbine engine in accordance with another exemplary embodiment of the present disclosure.
Figure 6:
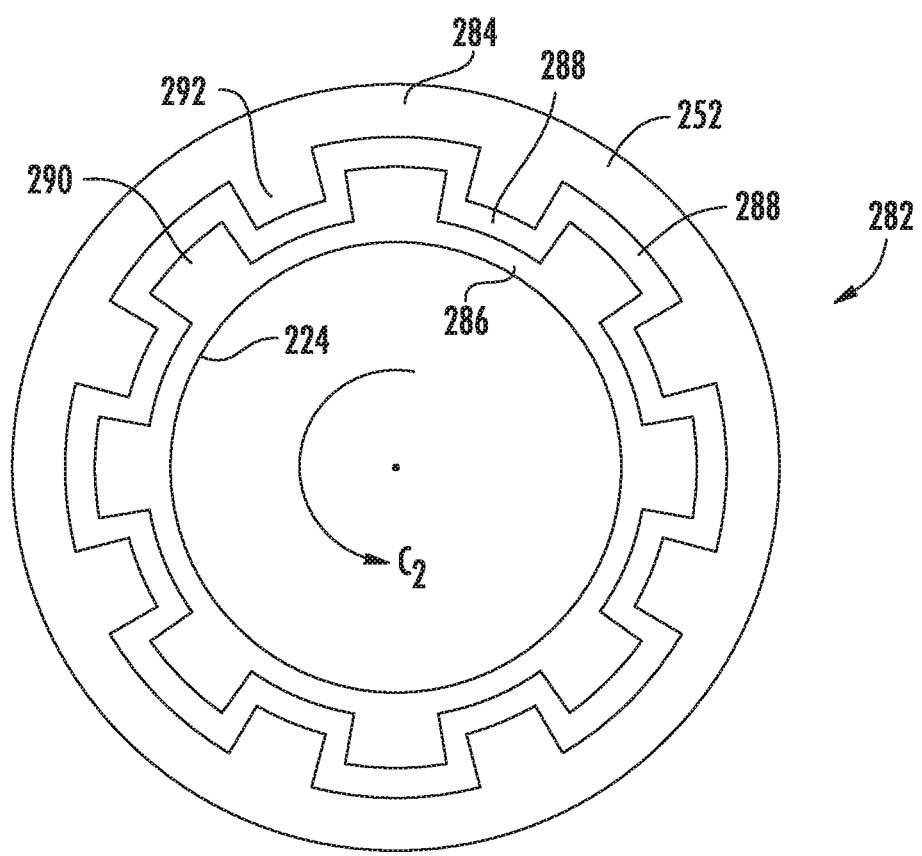
FIG. 6 is a close-up, cross-sectional view of a flexible connection member of a rotor connection member in accordance with an exemplary embodiment of the present disclosure, taken along Line 6-6 in FIG. 5.

Referring additionally to FIG. 6, providing a cross-sectional view of the splined coupling portions 284, 26 of the rotor connection member 252 and LP shaft 224, taken along Line 6-6 of FIG. 5, the splined coupling portion 286 of the LP shaft 224 includes a plurality of axial teeth 290 extending outward generally along a radial direction R, and spaced along a circumferential direction C. Similarly, the splined coupling portion 284 of the rotor connection member 252 includes a plurality of corresponding and complementary axial teeth 292 extending inwardly generally along the radial direction R and also spaced along the circumferential direction C. The damper 288 of the rotor connection member 252 is positioned between the splined coupling portion 286 of the LP shaft 224 and the splined coupling portion 284 of the rotor connection member 252. For the embodiment depicted, the damper 288 is configured as a dampening material extending between the axial teeth 290 and axial teeth 292 to absorb forces therebetween. In certain embodiments, the dampening material may be a resilient material, such as an elastomeric material.

However, in other embodiments, the dampening material may be any other suitable material. Additionally, in other embodiments, the damper 288 may not be configured as the dampening material, and instead may be configured as a viscous damper providing a flow of oil between the splined coupling portions of the LP shaft 224 and of the rotor connection member 252, a pneumatic damper providing an airflow between the splined coupling portions of the LP shaft 224 and of the rotor connection member 252, or any other suitable damper. When configured as a viscous damper, the damper 288 may receive a flow of oil from an electric machine lubrication system. When configured as a pneumatic damper, the damper 288 may receive a flow of compressed air from, e.g., a compressor section of the gas turbine engine.

Notably, although for the exemplary embodiment depicted, the flexible attachment member is configured between the rotor connection member 252 and the LP shaft 224, in other embodiments, the rotor connection member 252 may be configured as two separate connection members, each including a splined portion, the splined portions configured in a similar manner to achieve a similar result. Further, in other embodiments, the stator connection member 254 may include a flexible attachment member, or a flexible section, configured in a similar manner.

Inclusion of a connection member having a flexible element configured in accordance with one or more these embodiments may allow for the connection member to absorb forces along a radial direction R and along an axial direction. Moreover, inclusion of the connection member in accordance with certain of these embodiments may allow for the connection member to absorb forces along a circumferential direction C, such that the flexible element may be configured as a torsional damper for the electric machine 246. Such may be particularly beneficial for the rotary connection member, given a potential for torsional vibrations of the electric machine 246 due to, e.g., electric pulses, etc.

Figure 7:
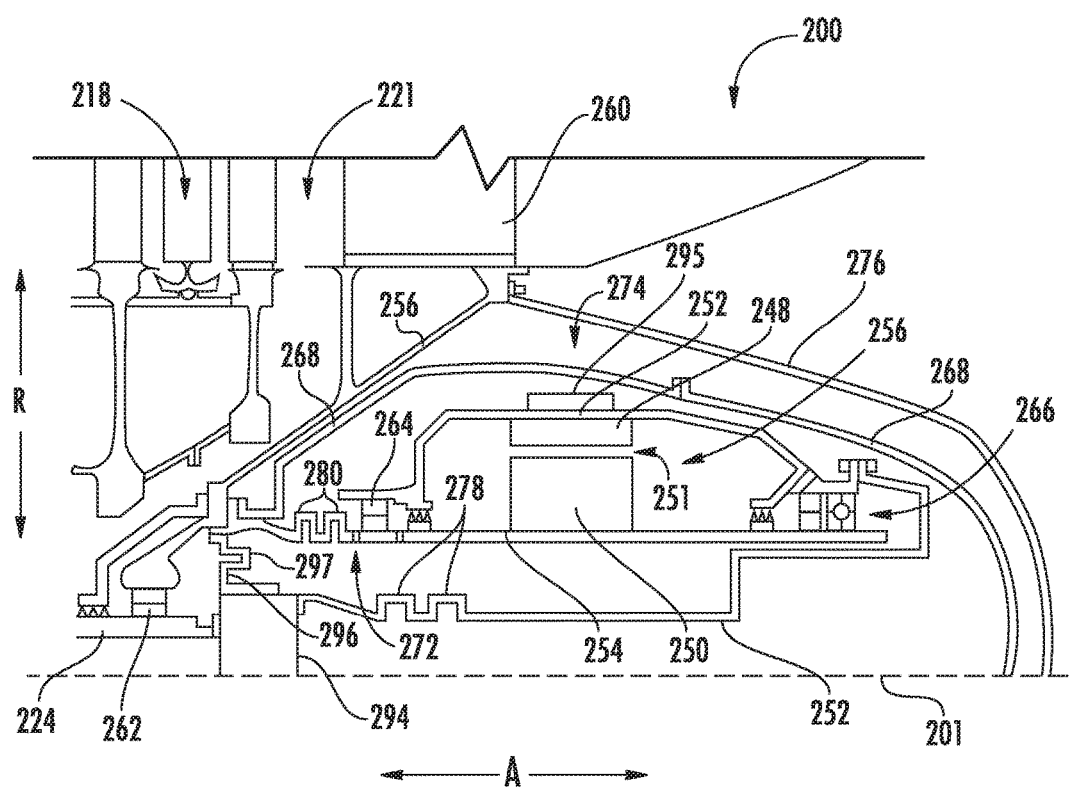
FIG. 7 is a schematic, cross-sectional view of an electric machine embedded in a gas turbine engine in accordance with yet another exemplary embodiment of the present disclosure.

It should also be appreciated, that in still other embodiments, the gas turbine engine and electric machine 246 may be configured in any other suitable manner for, e.g., providing a desired electrical power output. For example, referring now to FIG. 7, a close-up, schematic view of a gas turbine engine including an electric machine 246 in accordance with yet another exemplary embodiment of the present disclosure is provided. The exemplary gas turbine engine and electric machine 246 depicted in FIG. 7 may be configured in substantially the same manner as exemplary gas turbine engine and electric machine 246 depicted in FIG. 4 and described above.

For example, the gas turbine engine includes a rotor connection member 252 supporting a rotor 248 of the electric machine 246 and a stator connection member 254 supporting a stator 250 of the electric machine 246. The rotor connection member 252 is coupled to the rotary component and the stator connection member 254 is coupled to the static support member 256. Additionally, the rotor 248 and stator 250 together define an air gap. However, for the embodiment of FIG. 7, the rotor connection member 252 is not coupled directly to the rotary component, which for the embodiment depicted is an LP shaft 224. Instead, for the embodiment of FIG. 7, the rotor connection member 252 is coupled to the LP shaft 224 through a gearbox 294, such that the electric machine 246 is mechanically driven by the LP shaft 224 through the gearbox 294. The gearbox 294 may be, e.g., a planetary gearbox, a star gearbox, or any other suitable gearbox 294 for varying a rotational speed of the rotor connection member 252 (and rotor 248) relative to the LP shaft 224. Inclusion of the gearbox 294 between the rotor connection member 252 and the LP shaft 224 may allow for the electric machine 246 to, e.g., generate a desired amount of power output by having the rotor 248 rotate at a desired rotational speed, despite the particular dimensions of a cavity within which the electric machine 246 is positioned or an operational speed of the LP shaft 224.

For example, in certain exemplary embodiments, the gearbox 294 may be configured to increase a rotational speed of the rotor 248 relative to the rotary component/LP shaft 224. Notably, with such an exemplary embodiment, the rotor 248 may be rotated at relatively high rotational speeds, potentially generating high centrifugal forces for the rotor connection member 252 and rotor 248 to withstand. Such force may widen the air gap 251 between the rotor 248 and the stator 250, potentially reducing an efficiency of the electric machine 246. Accordingly, for the embodiment depicted, a containment band 295 is provided along an outside of the rotor connection member 252 for strengthening the rotor connection member 252 and rotor 248. In certain embodiments, the band 295 may be a composite band, such as a carbon fiber wrapped band, or alternatively, may be formed of any other suitable material.

In order to allow the gearbox 294 to, e.g., absorb static and dynamic forces that may act on the gearbox 294 during operation of the gas turbine engine, the gearbox 294 is flexibly mounted to a static frame member, or rather to a structural support member 256 extending from an aft engine strut 260 of the gas turbine engine. More specifically, for the embodiment depicted, the gearbox 294 is attached to the structural support member 256 through a gearbox connection member 296. The gearbox connection member 296 includes a flexible element, which for the embodiment depicted is configured as a baffle 297. Such a configuration may increase a lifespan of the gearbox 294 by mechanically isolating or insulating the gearbox 294 from certain forces exerted on or within the gas turbine engine.

Figure 9:
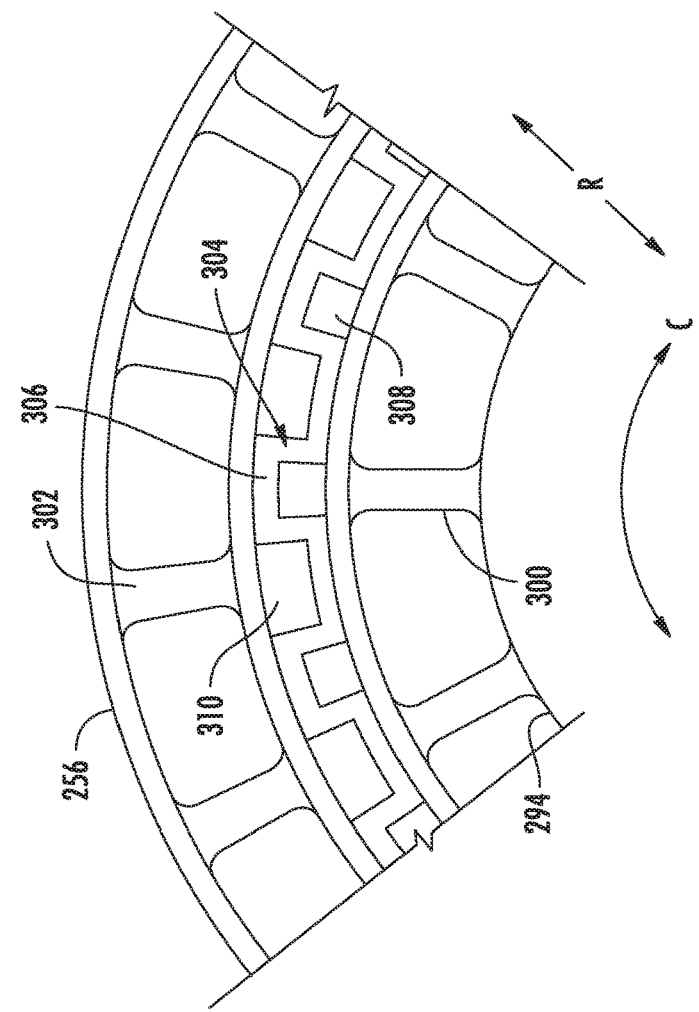
FIG. 9 is a cross-sectional view of the exemplary gearbox connection member of FIG. 8, taken along Line 9-9 in FIG. 8.
Figure 8:
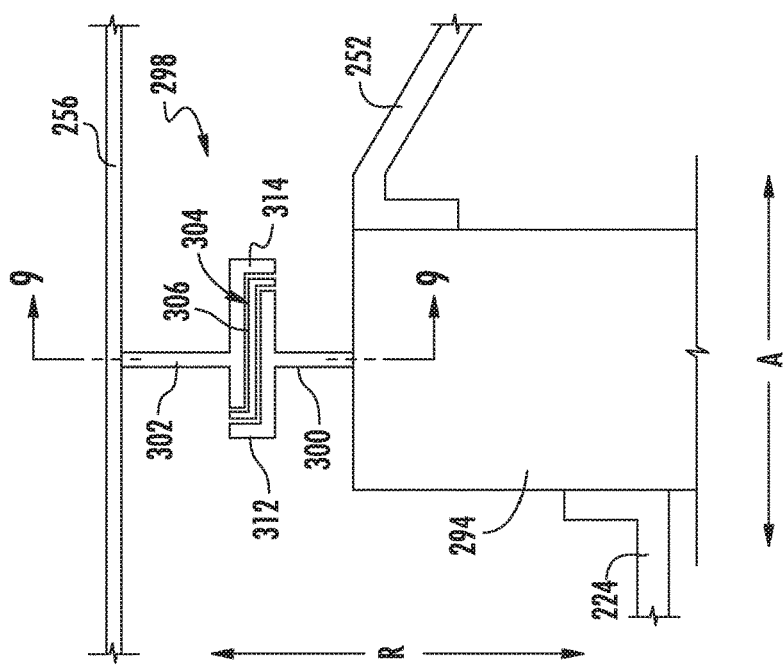
FIG. 8 is a schematic, cross-sectional, close up view of a gearbox connection member in accordance with an exemplary embodiment of the present disclosure.

It should be appreciated, however, that in other embodiments the gearbox 294 may be flexibly mounted to the structural support member 256 in any other suitable manner. For example, referring now to FIGS. 8 and 9, an alternative embodiment is depicted and described. FIG. 8 provides a close-up view of the gas turbine engine including an electric machine 246 in accordance with an exemplary aspect of the present disclosure is provided. More specifically, FIG. 8 provides a close-up view of the gearbox 294 positioned between a rotary component of the gas turbine engine and a rotor connection member 252 (extending to a rotor 248 of the electric machine 246 of the gas turbine engine). FIG. 9 provides a close-up, schematic view of a gearbox connection member 296 depicted in FIG. 8, along Line 9-9 in FIG. 8. The gas turbine engine depicted in FIGS. 8 and 9 may be configured in substantially the same manner as exemplary gas turbine engine described above terms to FIG. 7, and accordingly, the same or similar numbers may refer to the same or similar part.

The gearbox connection member 296 includes a flexible element. However, for the embodiment depicted, the flexible element is configured as a torsional damper 298 for accommodating torsional vibration of the gearbox 294 relative to the rotary component or other components of the gas turbine engine.

Particularly for the embodiment depicted, the torsional damper 298 of the gearbox connection member 296 provides dampening of the gearbox 294 along an axial direction A, along a radial direction R, and along a circumferential direction C. For example, the exemplary flexible element depicted includes a first attachment member 300 connected to the gearbox 294 and a second attachment member 302 connected to a structural support member 256. The first attachment member 300 and second attachment member 302 together define an attachment interface 304 made up of a plurality of interdigitated members with a damper 306 positioned at least partially between the interdigitated members.

For example, referring specifically to FIG. 9, the first attachment member 300 includes a plurality of circumferentially spaced teeth 308 extending outwardly generally along the radial direction R. Similarly, the second attachment member 302 includes a corresponding and complementary plurality of circumferentially spaced teeth 310 extending inwardly generally along the radial direction R. The teeth 308 of the first attachment member 300 extend into circumferential gaps defined between adjacent teeth 310 of the second attachment member 302, and conversely, the teeth 310 of the second attachment member 302 extend into circumferential gaps defined between adjacent teeth 308 of the first attachment member 300. Additionally, the damper 306 is positioned between the teeth 308 of the first attachment member 300 and the teeth 310 of the second attachment member 302.

Referring again to FIG. 8, the first attachment member 300 includes a forward lip 312 extending outwardly generally along the radial direction R, and the second attachment member 302 includes an aft lip 314 extending inwardly generally along the radial direction R. The forward lip 312 of the first attachment member 300 is configured to interface with the second attachment member 302, and the aft lip 314 of the second attachment member 302 is configured to interface with the first attachment member 300. Such a configuration may prevent movement of the first attachment member 300 relative to the second attachment member 302 along the axial direction A more than a predetermined amount. Notably, the damper 306 of the torsional damper 298 further extends between the forward lip 312 and the second attachment member 302, and also between the aft lip 314 and the first attachment member 300. However, in other embodiments, the torsional damper 298 may instead, or in addition, include any other means for limiting movement along the axial direction A. For example, in other exemplary embodiments, the torsional damper 298 may include one or more pins, bolts, etc. extending generally along the radial direction R between the first attachment member 300 and the second attachment member 302. The one or more pins, bolts, etc. may be enclosed within the damper 306 to allow for dampening along the axial direction A.

The damper 306 may be configured as a dampening material formed of any material suitable for absorbing force and/or vibration. For example, the damper 306 may be any resilient material, such as an elastomeric material. However, in other embodiments, any other suitable material or configuration may be utilized, or, any other suitable damper 306 may be provided. For example, in other embodiments, the damper 306 may be configured as a viscous damper or a pneumatic damper. For example, in certain embodiments, the dampening material may be oil, such that torsional damper 298 includes a squeeze film damper, or other similar structure.

As stated, the torsional damper 298 of the exemplary gearbox connection member 296 depicted may be capable of absorbing forces along the axial direction A, the radial direction R, and the circumferential direction C. Accordingly, a connection member in accordance with one or more embodiments of the present disclosure may be capable of extending a life of, e.g., the gearbox 294, by reducing an amount of stress or strain on the gearbox 294 (or proximally mounted components).

It should be appreciated that the flexible members described above with reference to one or more of the rotor connection member 252, stator connection member 254, and gearbox connection member 296 may be used, in other exemplary embodiments, interchangeably within any of the three connection members described herein.

Moreover, referring now to FIG. 10, a schematic, cross-sectional view is provided of a gas turbine engine in accordance with another exemplary embodiment of the present disclosure. In certain embodiments, the exemplary gas turbine engine depicted in FIG. 10 may be configured in substantially the same manner as exemplary gas turbine engine described above with reference FIG. 3. Accordingly, the same or similar numbers may refer to the same or similar part. For example, as is depicted, the gas turbine engine is configured as a turbofan engine generally comprising a fan 202 and a core turbine engine 204. The core turbine engine 204 includes an LP compressor 210 connected to an LP turbine 218 through an LP shaft 224, as well as an HP compressor 212 connected to an HP turbine 216 through an HP shaft 222. For the embodiment depicted, the turbofan engine 200 further includes an electric machine 246. The electric machine 246 may be configured in substantially the same manner as one or more of the embodiments described above with reference to FIGS. 4 through 9.

However, as is depicted schematically and in phantom, for the embodiment depicted, the electric machine 246 may be positioned at any other suitable location. For example, the electric machine 246 may be an electric machine 246A coaxially mounted with the LP shaft 224 at a location forward of the HP compressor 212 and substantially radially inward of the LP compressor 210. Additionally, or alternatively, the electric machine 246 may be an electric machine 246B coaxially mounted with the HP shaft 222, e.g., at a location forward of the HP compressor 212. Additionally, or alternatively still, the electric machine 246 may be an electric machine 246C coaxially mounted with the LP shaft 224 a location at least partially aft of the HP turbine 216 and at least partially forward of the LP turbine 218. Additionally, or alternatively still, the electric machine 246 may be an electric machine 246D coaxially mounted with the LP shaft 224 and the HP shaft 222, such that the electric machine 246D is a differential electric machine. Moreover, in still other embodiments, the electric machine 246 may be mounted at any other suitable location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and an axial direction, the gas turbine engine comprising:
   a compressor section and a turbine section arranged in serial flow order, the compressor section and turbine section together defining a core air flowpath;
   a rotary component rotatable with at least a portion of the compressor section and with at least a portion of the turbine section;
   a static frame member;
   a rotor connection member; and
   an electric machine comprising a rotor and a stator, the rotor being rotatable with the rotary component, the electric machine positioned at least partially inward of the core air flowpath along the radial direction, the electric machine flexibly mounted to the static frame member, or flexibly coupled to the rotary component, or both, the rotor connection member supporting the rotor of the electric machine, wherein the rotor connection member flexibly couples the rotor to the rotary component of the gas turbine engine;
   wherein the electric machine is positioned at least partially within or aft of the turbine section along the axial direction.

2. The gas turbine engine of claim 1, further comprising:
   a stator connection member supporting the stator of the electric machine, wherein the stator connection member flexibly mounts the stator to the static frame member.

3. The gas turbine engine of claim 2, wherein the stator connection member comprises a flexible element such that the stator connection member flexibly mounts the stator of the electric machine to the static frame member.

4. The gas turbine engine of claim 1, wherein the rotor connection member comprises a flexible element such that the rotor connection member flexibly couples the rotor of the electric machine to the rotary component.

5. The gas turbine engine of claim 1, wherein the electric machine comprises a rotor and a stator, wherein the gas turbine engine further comprises:
   a stator connection member supporting the stator of the electric machine and mounted to the static frame member; and
   wherein at least one of the stator connection member or rotor connection member comprises a damper.

6. The gas turbine engine of claim 5, wherein the damper is at least one of a viscous damper or a pneumatic damper.

7. The gas turbine engine of claim 5, wherein the damper is a torsional damper.

8. The gas turbine engine of claim 5, wherein the damper comprises an elastomeric material.

9. The gas turbine engine of claim 5, wherein the gas turbine engine further defines a circumferential direction, wherein the damper provides damping along the axial direction, radial direction, and circumferential direction.

10. The gas turbine engine of claim 1, further comprising:
    a power gearbox, wherein the electric machine is mechanically driven by the rotary component through the power gearbox.

11. The gas turbine engine of claim 10, wherein the power gearbox is flexibly mounted to the static frame member.

12. The gas turbine engine of claim 10, further comprising a containment band positioned along the rotor connection member at a location radially outward of the rotor of the electric machine for strengthening the rotor connection member.

13. A propulsion system for an aeronautical device comprising:
    an electric propulsor; and
    gas turbine engine defining a radial direction and an axial direction, the gas turbine engine comprising a compressor section and a turbine section arranged in serial flow order, the compressor section and turbine section together defining a core air flowpath;

a rotary component rotatable with at least a portion of the compressor section and with at least a portion of the turbine section;

a static frame member;

a stator connection member and a rotor connection member; and an electric machine comprising a rotor and a stator, the rotor being rotatable with the rotary component, the electric machine positioned at least partially inward of the core air flowpath along the radial direction, the electric machine electrically connected to the electric propulsor, the stator connection member supporting the stator of the electric machine and mounted to the static frame member and the rotor connection member supporting the rotor of the electric machine, wherein at least one of the stator connection member or rotor connection member comprises a torsional damper such that the electric machine is flexibly mounted to the static frame member, or flexibly coupled to the rotary component, or both;

wherein the stator connection member comprises the torsional damper such that the stator connection member flexibly mounts the stator to the static frame member.

14. The propulsion system of claim 13, wherein the rotor connection member comprises the torsional damper such that the rotor connection member flexibly couples the rotor to the rotary component of the gas turbine engine.

15. The propulsion system of claim 13, further comprising:

a power gearbox, wherein the electric machine is mechanically driven by the rotary component through the power gearbox, and wherein the power gearbox is flexibly mounted to the static frame member.

16. The propulsion system of claim 13, wherein the gas turbine engine further defines a circumferential direction, wherein the torsional damper provides damping along the axial direction, radial direction, and circumferential direction.

17. A gas turbine engine defining a radial direction and an axial direction, the gas turbine engine comprising:

a compressor section and a turbine section arranged in serial flow order, the compressor section and turbine section together defining a core air flowpath;

a rotary component rotatable with at least a portion of the compressor section and with at least a portion of the turbine section;

a static frame member;

an electric machine rotatable with the rotary component, the electric machine positioned at least partially inward of the core air flowpath along the radial direction, the electric machine flexibly mounted to the static frame member, or flexibly coupled to the rotary component, or both, wherein the electric machine is positioned at least partially within or aft of the turbine section along the axial direction; and a power gearbox, the electric machine being mechanically driven by the rotary component through the power gearbox and the power gearbox being flexibly mounted to the static frame member.

18. A gas turbine engine defining a radial direction and an axial direction, the gas turbine engine comprising:

a compressor section and a turbine section arranged in serial flow order, the compressor section and turbine section together defining a core air flowpath;

a rotary component rotatable with at least a portion of the compressor section and with at least a portion of the turbine section;

a static frame member;

a rotor connection member; and an electric machine comprising a rotor and a stator, the rotor being rotatable with the rotary component, the electric machine positioned at least partially inward of the core air flowpath along the radial direction, the electric machine flexibly mounted to the static frame member, or flexibly coupled to the rotary component, or both, the rotor connection member supporting the rotor of the electric machine, wherein the rotor connection member flexibly couples the rotor to the rotary component of the gas turbine engine;

a stator connection member supporting the stator of the electric machine, wherein the stator connection member flexibly mounts the stator to the static frame member.

\* \* \* \* \*